United States Patent
Lust

(10) Patent No.: US 9,873,294 B2
(45) Date of Patent: Jan. 23, 2018

(54) RUNFLAT DEVICE AND A METHOD FOR FITTING THE SAME

(71) Applicant: RUN FLAT SYSTEMS LIMITED, Sheffield (GB)

(72) Inventor: Richard Lust, Buckinghamshire (GB)

(73) Assignee: RUN FLAT SYSTEMS LIMITED, Sheffield (GB)

(*) Notice: Subject to any disclaimer, the term of this patent is extended or adjusted under 35 U.S.C. 154(b) by 0 days.

(21) Appl. No.: 14/860,176

(22) Filed: Sep. 21, 2015

(65) Prior Publication Data

US 2016/0009147 A1  Jan. 14, 2016

Related U.S. Application Data

(63) Continuation of application No. 13/138,972, filed as application No. PCT/GB2010/000919 on May 7, 2010, now Pat. No. 9,242,514.

(30) Foreign Application Priority Data

May 7, 2009 (GB) .................................. 0907888.2

(51) Int. Cl.
*B60C 17/04* (2006.01)
*B60C 17/00* (2006.01)
*B60C 17/06* (2006.01)

(52) U.S. Cl.
CPC .............. *B60C 17/00* (2013.01); *B60C 17/04* (2013.01); *B60C 17/041* (2013.01); *B60C 17/044* (2013.01); *B60C 17/048* (2013.01); *B60C 17/06* (2013.01); *Y10T 29/49494* (2015.01)

(58) Field of Classification Search
CPC ..... B60C 17/00; B60C 17/044; B60C 17/041; B60C 17/06; Y10T 29/49494
USPC ....... 152/400, 152, 155, 450, 516, 156, 157, 152/158, 517, 518, 519, 529
See application file for complete search history.

(56) References Cited

U.S. PATENT DOCUMENTS

| 4,216,810 | A | * | 8/1980 | Osada ............... B60C 17/04 152/158 |
| 4,263,953 | A | | 4/1981 | Miceli |
| 4,293,016 | A | * | 10/1981 | Bible ............... B60C 17/06 152/158 |
| 5,215,137 | A | | 6/1993 | Weeks et al. |
| 6,681,822 | B2 | | 1/2004 | Adams et al. |
| 7,040,365 | B2 | | 5/2006 | Lust |

(Continued)

FOREIGN PATENT DOCUMENTS

| GB | 2238276 A | 5/1991 |
| WO | 2004069564 A1 | 8/2004 |
| WO | 2010128305 A1 | 11/2010 |

OTHER PUBLICATIONS

Office Action dated Mar. 17, 2015 for U.S. Appl. No. 13/138,972, 10 pages.

(Continued)

*Primary Examiner* — S. Joseph Morano
*Assistant Examiner* — Jean Charleston
(74) *Attorney, Agent, or Firm* — Smith IP Services, P.C.

(57) ABSTRACT

A runflat device can include a double sided beadlock. The runflat device can be fitted to any size and type of wheel, regardless of a shape and depth of a wheel well. The runflat device can be fitted using standard tools, and may be tightened by manipulation of a valve assembly.

20 Claims, 6 Drawing Sheets

(56) References Cited

U.S. PATENT DOCUMENTS

| | | |
|---|---|---|
| 7,789,116 B2 | 9/2010 | Campbell et al. |
| 2002/0096237 A1 | 7/2002 | Burhoe et al. |
| 2005/0126672 A1 | 6/2005 | Florence et al. |
| 2006/0113018 A1* | 6/2006 | Naito ............... B60C 17/06 152/400 |
| 2009/0107596 A1 | 4/2009 | Palinkas et al. |
| 2010/0096059 A1 | 4/2010 | Lust |
| 2011/0248554 A1 | 10/2011 | Chon et al. |
| 2012/0223569 A1 | 9/2012 | Lust |
| 2016/0001610 A1 | 1/2016 | Lust |

OTHER PUBLICATIONS

Office Action dated Jul. 1, 2015 for U.S. Appl. No. 13/138,972, 8 pages.

Written Opinion of the International Preliminary Examining Authority dated Feb. 4, 2015 for International Patent Application No. PCT/GB2014/050485, 7 pages.

International Preliminary Report on Patentability dated May 22, 2015 for International Patent Application No. PCT/GB2014/050485, 14 pages.

International Search Report with Written Opinion dated May 21, 2014 for International Patent Application No. PCT/GB2014/050485, 12 pages.

Australian Examination Report dated Jun. 21, 2017 for AU Patent Application No. 2016203977, 3 pages.

\* cited by examiner

RUNFLAT DEVICE AND A METHOD FOR FITTING THE SAME

CROSS-REFERENCE TO RELATED APPLICATIONS

This application is a continuation of prior application Ser. No. 13/138,972 filed on 7 Nov. 2011, which is a national stage of International application serial no. PCT/GB2010/000919 filed on 7 May 2010, which claims Paris Convention priority to UK application serial no. 0907888.2 filed on 7 May 2009. The entire disclosures of these prior applications are incorporated herein by this reference.

The present invention relates to a runflat device, particularly, but not exclusively, a combined runflat and double sided beadlock that can be fitted to a single piece drop centre wheel; to a method for fitting the same; and to a wheel so fitted.

On a normal vehicle wheel and tyre assembly, the beads of the tyre sit in 'seats' of the wheel rim and, when the tyre is inflated, internal air pressure holds the beads in place.

In the event of a tyre deflation whilst a vehicle is in motion the tyres beads can move inwards from the wheel rims seats. When this occurs, grip between the tyre and the wheel rim is decreased. This can allow the tyre to slip circumferentially around the wheel and as a consequence the vehicle loses traction, as the wheel can rotate within the tyre and its beads, or the vehicle can lose braking efficiency as the rotation of the wheel may be stopped by the vehicle's brakes while the tyre continues to rotate. As the tyre is loose on the rim it can flail and rapidly break up and if on a steering wheel then steering control is impaired.

There are devices, variously known as 'well fillers', available to prevent tyre beads slipping into the wheel's well, but these do not stop the tyre moving circumferentially round the wheel rim when running deflated due to the well filler of necessity being of a lesser diameter than the wheel's seats and therefore the tyres beads. It is necessary for well filler's to be of a smaller diameter than the wheel's seats and the tyres beads otherwise it would be impossible to fit the tyre to the wheel. These devices are not designed to lock the tyres beads into place on the wheel rim and therefore the tyre may move circumferentially around the wheel rim, therefore traction and braking control may be compromised.

There are devices, variously known as 'runflat assemblies', 'runflat inserts' or 'runflat devices' that may be fitted to a single piece drop centre wheel rim. These may have a diameter greater than the seats and the flanges of the wheel rim and be of sufficient diameter to support the tread of the tyre when running flat. Generally, these devices are supported by a part of their main body sitting in the wheel's well. This provides only a small footprint area; since space has to be left in the wheel's well to allow the tyre's outer bead to be fitted when fitting the tyre. As a result, stability of the runflat device may be compromised when the vehicle is running with a deflated tyre. The device can also be forced sideways within the wheel well in extreme runflat situations. In systems using an annular base fitted with a second outer ring (or segments forming a ring) which may rotate when the vehicle is running on a flat tyre, the small footprint area available to support the second or rotatable ring or annular segments is narrow, reducing the capability of spreading the rotational forces and vehicle weight over a larger area and reducing pressure between the rotating parts. High pressures over a small contact area increase friction, which produces heat, reducing the device's longevity and therefore runflat distance capability.

Typically, these devices can not lock the tyres beads in place in the wheel rims seats, therefore although the tyre may be supported when running flat, traction and braking may be compromised as the tyre is able to slip circumferentially around the wheel rim.

Most current runflat devices take a long time to fit, relative to fitting the tyre, and for fitting require extra tools or equipment in addition to the tyre fitter's normal tools and equipment.

The present invention attempts to overcome the above problems faced in the known art and thus provides a method and system for fitting a runflat device to a vehicle wheel.

According to a first embodiment of the present invention there is provided a runflat device arranged to be disposed on a wheel inside a tyre, the runflat device comprising a body having a length which, in use, extends around the circumference of a wheel and further comprising a valve assembly and a retraction mechanism connected to the valve assembly, wherein the valve assembly is movable to retract the runflat device onto the wheel by means of the retraction mechanism.

Previous systems generally require the use of specialised tools to fit and tighten a runflat device, or rely on removing all or part of the valve to provide access to a tightening mechanism. This complicates and prolongs the fitting process, and requires the use of non-standard tools. In one alternative method, air flow through a specially modified valve drives the tightening mechanism. However, in order to redirect the airflow, a part of the interior of the valve must be manipulated, which requires removal of the valve core.

The present invention is advantageous in that it may be fitted while fitting a tyre (as described further below) using normal tools, and may then be tightened by simply manipulating the entire valve assembly. There is no need for any part of the valve to be removed. Preferably, the valve assembly is rotatable using a standard tool such as a spanner or socket wrench, so that a predetermined torque can be reliably applied. However, other manipulation such as a pivoting motion, used in conjunction with a ratchet arrangement, may also be used to tighten the runflat.

The runflat device may further comprise linkage, such as a universal joint which may be internal to the runflat device, fitted to the end of the valve assembly. The universal joint preferably runs to a miniature gear transfer box, which is in turn connected to the retraction mechanism.

The retraction mechanism of the runflat device may also comprise one or more cables running along the length of the runflat device, and preferably a left and right hand threaded shaft connectable to the or each cable and rotatable to draw the ends of the or each cable together. The shaft may be rotated directly or indirectly by manipulation, e.g. rotation, of the valve assembly.

In order that the length of the runflat device, and hence its eventual circumference, may be readily altered, its body preferably comprises a plurality of segments. Lengthening or shortening the runflat device is then simply a matter of adding or removing segments. If each segment is of a common/uniform length, the inclusion of a further segment can provide a known increase in final diameter of, for example, one inch.

So as to ensure alignment of the segments during fitting of the runflat device, and to provide strength to the finished device, each segment may comprise features to ensure alignment with adjacent segments. Preferably, the features are shaped to provide a camming action during tightening of the runflat device in the event that adjacent segments are not in alignment. Part-circular protrusions and indentations, among other designs, are suitable.

The runflat device preferably has a cantilever-like cross-section, for example comprising a substantially flat top plate with a pair of angled side portions extending therefrom on which the runflat rests in use. In use, the runflat will then be supportable across the width of a wheel without extending into the wheel well. The side portions may form an inverted 'V' with its apex at the mid point of the top plate.

It is beneficial if the body of the runflat device comprises a resilient material, for example a plastics material. This in conjunction with the cantilever-like cross-section of the body allows for tightening of the runflat device to force the side portions outwards into the beads of a tyre to provide a beadlock.

A beadlock is generally defined as a device that puts quite considerable lateral pressure on the tyre's beads in order to force them into the sides of the wheel 'seats' and up against the wheel's flanges in order to prevent tyre to wheel slippage under extreme conditions.

Some known runflat devices incorporate a bead filler, for example as described in WO 01/87646 where the runflat grips the tyre's beads through the use of serrated edges. However, such devices differ from true beadlocks in that they merely grip the beads rather than forcing them against the wheel rim to effectively lock the tyre's beads in place in the wheel rim's seats. Therefore, although the tyre may be supported when running flat, traction and braking may be compromised as the tyre is able to slip circumferentially around the wheel rim.

The runflat according to the present invention applies much greater lateral pressure and effectively meets what users require and expect in a true headlock. A further feature of the present invention is that in operation, when running with a deflated tyre, an increase in the force exerted on the runflat device, such as from the weight and movement of a vehicle, simply increases existing beadlock pressure as the loads are transferred through the segments and laterally into the tyre's beads. As a result, beadlock pressure advantageously adapts, to some extent, to the conditions under which the runflat is operating.

As a further advantage, the runflat device may further comprise an outer sleeve, preferably comprising a dissimilar material from the body of the runflat device, and which is rotatable with respect to the body of the runflat device and is, in use, located adjacent the interior surface of a tyre. By providing a rotatable part in the runflat device, friction between a punctured or flat tyre and the runflat device can be reduced, leading to improved and/or prolonged performance.

A second aspect of the present invention provides a runflat device comprising a number of discrete segments connectable together to form a chain which, in use, runs around the circumference of a wheel.

This provides a highly adaptable runflat device, which can be easily modified to fit a variety of wheel diameters. Lengthening or shortening the runflat device is then simply a matter of adding or removing segments. If each segment is of a common length, the inclusion of a further segment can provide a known increase in final diameter of, for example, one inch.

For the reasons described above, each segment may comprise a resilient material, preferably a plastics material, and is preferably of a uniform length and/or comprises features to ensure alignment with adjacent segments. The features may be shaped, for example as part-circular protrusions and indentations, to provide a camming action during tightening of the runflat device in the event that adjacent segments are not in alignment.

Each segment may comprise a substantially flat top plate with a pair of side portions on which the runflat rests in use. The side portions preferably extend at an angle from the plane of the top plate, perhaps forming an inverted 'V' with its apex at the mid point of the top plate.

It is beneficial if the segments are connectable to one or more cables to form the body of the runflat device. Preferably, each segment comprises one or more cable guides which may hook around said one or more cables. This makes the addition or removal of individual segments very straightforward. Said cable or cables should have ends which may be drawn towards each other to tighten the runflat device to a wheel, possibly via a retraction mechanism connected to a valve assembly which is movable to tighten the runflat device.

The runflat device may further comprise an outer sleeve which is rotatable with respect to the segments and is, in use, located adjacent the interior surface of a tyre. The outer sleeve preferably comprises a low friction material, which is preferably dissimilar to the material of the segments.

According to a third aspect of the present invention there is provided a wheel and runflat device combination, the wheel having a pair of rims with an area therebetween, and the runflat device being located such that it rests on parts of the wheel adjacent the rims and spans said area.

Many existing designs require a part of the runflat to sit on an area between the rims of a wheel. This may simply be a flat area, but it is commonly the base of a wheel well. Given that the depths of wheel wells vary (currently 3 different depths on common non-commercial wheels, plus 2 depths on commercial wheels), as do their shapes/positions, existing runflat designs must come in various sizes and shapes, and/or rely on the fitting of alternative 'rings' in order to compensate for different wheel wells. Further modifications are required for wheels which do not comprise a wheel well. In the present invention, the shape, depth or even the presence of a wheel well is irrelevant, meaning that the runflat device may be provided in a universal width fitting with no need for wheel well size, shape, position or depth information. This makes this runflat a universal fit on a wide variety of wheels regardless of design, shape or well depth, negating the need for wheel details when ordering (just width, diameter and tyre aspect ratio).

Preferably, a cavity is provided between the runflat device, which may comprise one or more of the features and associated benefits described above, and the wheel well. This cavity may be filled with suitable filling materials, such as a lightweight foam, should the particular application require.

According to a further aspect of the present invention there is provided a wheel and runflat device combination, the wheel being rotatable about its axis, and the runflat device comprising a first part which is attached to the wheel so as to rotate therewith, and a second part which is connected to the first part but free to rotate relative thereto.

When a tyre is flat, it will, due to its larger diameter, move against the surface of the runflat device. By providing a rotatable part in the runflat device, friction between a punctured or flat tyre and the runflat device can be reduced, leading to improved and/or prolonged performance.

Preferably, the second part, which may comprise an outer sleeve, is formed from a low friction material which is ideally dissimilar to the material of the first part.

The runflat device preferably comprises one or more of the features of the runflat device described above, and has the associated benefits.

A further aspect of the present invention provides a method of fitting a runflat device to a wheel, comprising the steps of:
- inserting the runflat device into a tyre cavity;
- fitting a first bead of the tyre to the wheel rim;
- connecting two ends of the runflat device together;
- retrieving a valve, forming part of the runflat device, from the tyre cavity;
- fitting a second bead of the tyre to the wheel;
- pulling the valve through the valve hole in the wheel; and
- manipulating the valve to tighten the runflat device to a predetermined degree.

The method, which may also comprise applying tyre fitters' lubricant to the inside of the beads of the tyre, allows for quick and easy fitting of a runflat device using standard tools and procedures. The runflat device is preferably as previously described.

Preferably, the tyre is inflated and deflated, via the valve, to seat the runflat device on the wheel prior to manipulating, for example rotating, the valve to tighten the runflat device. Through appropriate design of the runflat device, a lateral force may be applied to the beads of the tyre by the runflat device as it is tightened.

The method may further comprise the step of filling a cavity provided by the runflat device with lightweight filling material, such as a lightweight foam. Such filling material could, for example, be pumped into the cavity via the air valve.

In order that the present invention is more readily understood, a preferred embodiment thereof will now be described.

The runflat device of the preferred embodiment fits across the entire width of the wheel and does not sit in the wheel's well or rely on a well in any way, so does not have to be adapted for varying wheel well depths. The sectional construction of the runflat also allows for differing wheel diameters to be easily accommodated. As such, the design is unique in that it can be fitted to any size and type of wheel, be it a single-piece, multi-piece, two-piece or split rim. The flexibility of the tightening linkage and use of a standard steel air valve assembly also simplifies fitting, permitting the use of standard tools and allowing tightening to a controlled predetermined torque, which is an important safety feature.

The segments have a degree of resilience. This, in conjunction with their shape allows the runflat device to provide a reliable beadlock, and to be effective in situations requiring mine deflection. The shape of the segments also allows support for a flat tyre to be provided at the centreline of the tyre/wheel rather than off centre as in some other systems, reduces weight and provides a cavity within the runflat device which can be filled if desired. An externally fitted roller is provided on the exterior of the runflat device, and can rotate relative to the remainder of the device to reduce friction between the device and a flat tyre.

The following description makes reference to FIGS. 1 to 7 of the accompanying drawings, in which.

Figure 1:
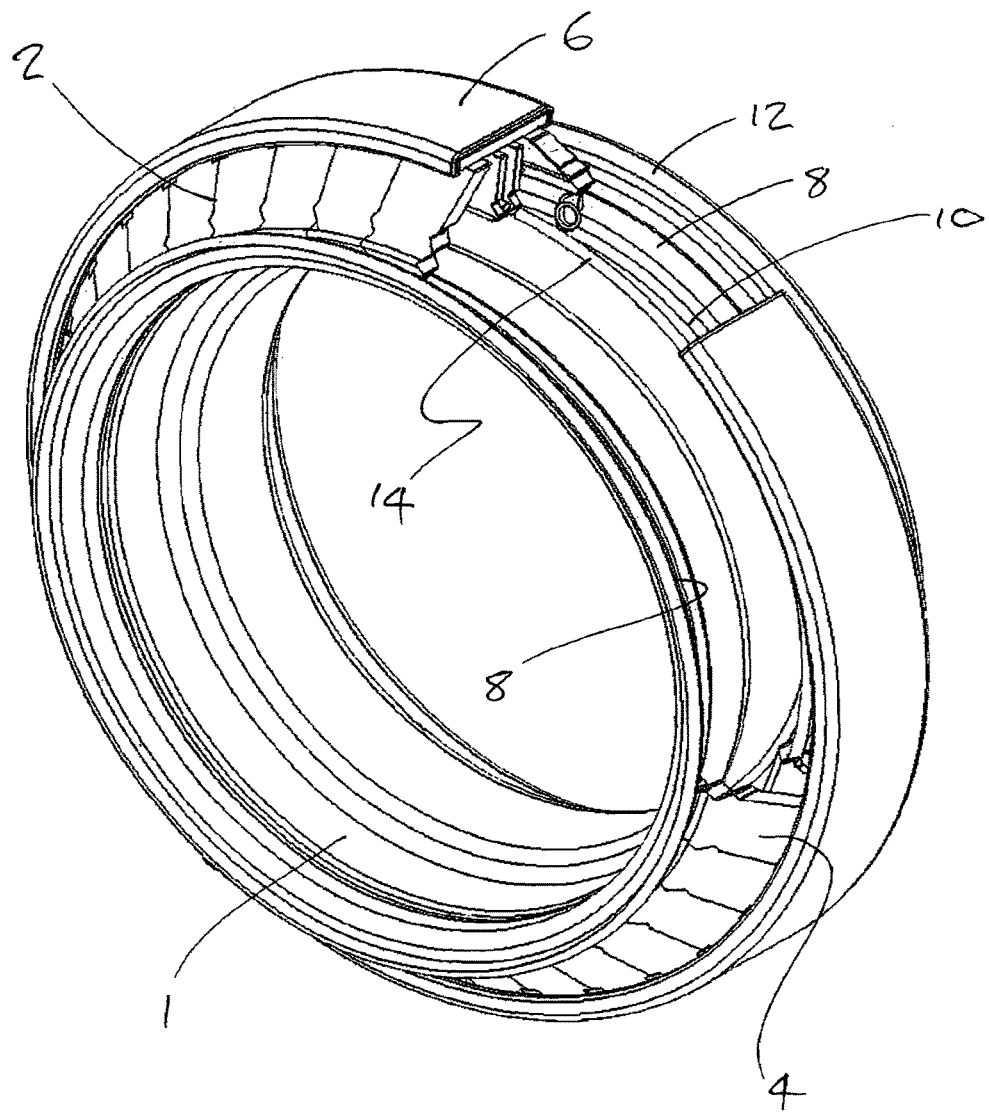
FIG. 1 is a perspective view of a wheel rim with a runflat device according to the invention fitted thereto.

The perspective view of FIG. 1 shows a standard single-piece drop centre wheel 1, to which a runflat device 2 according to the present invention has been fitted. The runflat device 2 is made up of a number of uniform segments 4, some of which have been omitted for clarity, and an outer sleeve/roller 6 is provided to the exterior of the runflat device. Each segment 4 of the runflat device 2 is seated on the bead retention humps 8 of the wheel 1 so as to span the wheel well 10. The beads of a tyre (not shown) would be located in the gap provided between each wheel rim 12 and the outside edge of the segments 4 of the runflat device 2.

A cable 14 is shown running between the individual segments of the runflat device 2 connecting them together. The cable 14 is additionally used in tightening the runflat device 2 onto the wheel 1 as will be described later.

Figure 2:
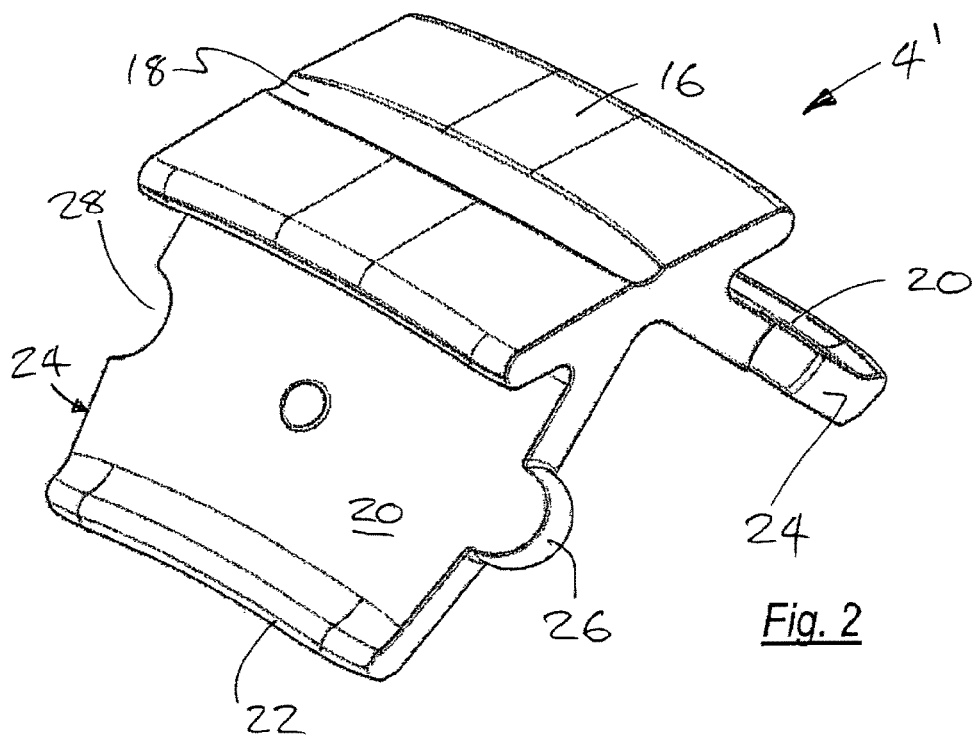
FIG. 2 is a perspective view of one segment of a runflat device according to the present invention.
Figure 3:
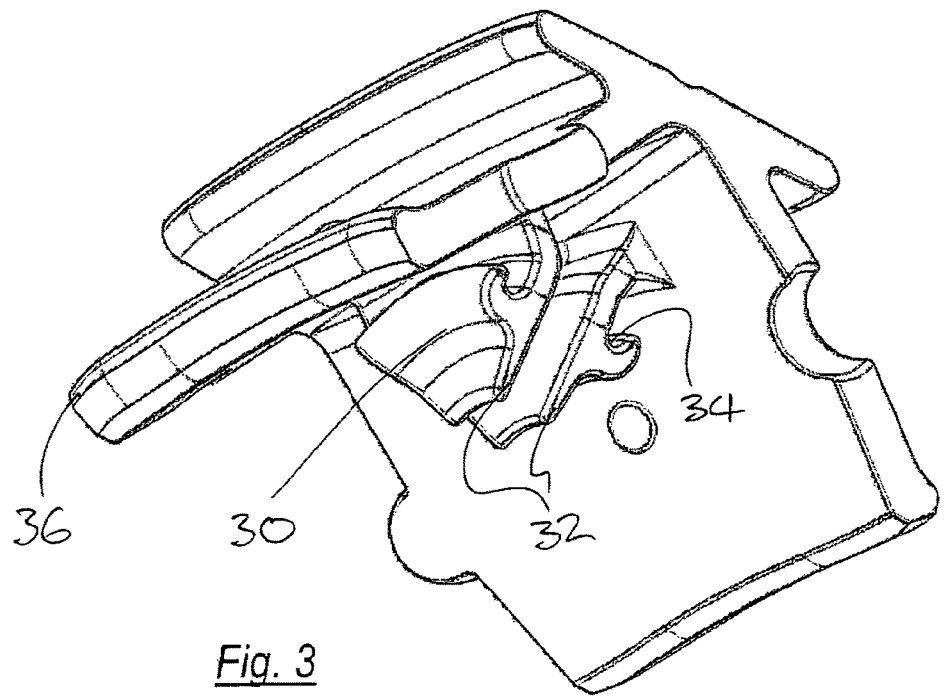
FIG. 3 is a further perspective view of one segment of a runflat device according to the present invention.

FIGS. 2 and 3 show alternative views of an individual segment 4' which, although it differs in some respects to the segments 4 shown in the FIG. 1, forms a part of a complete runflat device 2 similar to that described above. The segments 4' are made from a plastics material which incorporates a degree of flex, for reasons that are described later.

In FIG. 2 the segment 4' is viewed from above (from what, in use, would be the outer surface of the runflat device 2). The segment 4' comprises a generally rectangular top plate 16 having a length which, in use, forms part of the circumference of the complete runflat device, and a width. The top plate 16 is provided on its upper surface (as shown) with a shallow groove 18 running along its length at the centre of its width. From the underside of the top plate 16 a pair of side portions 20 extend. Each side portion 20 runs the entire length of the top plate 16, and extends, at an oblique angle, away from a position adjacent the centre of the width of the top plate 16 such that the side portions 20 form an inverted 'V' with its apex at the centre of the width of the top plate 16. In wider configurations, there may be a gap between the sides portions where they meet the top plate. The ends of the side portions 20 distal from the top plate 16 provide each segment with a pair of base edges 22 on which the segment rests on the bead retention humps 8 as shown in FIG. 1.

The ends 24 of the side portions 20 of each segment 4', where the segment 4' will abut with adjacent segments, are provided with part-circular protrusions 26 and indentations 28 to ensure that a plurality of adjacent segments 4' are correctly aligned. In the event that two adjacent segments are initially misaligned, the part-circular nature of the protrusions 26 and indentations 28 provides a camming action as the segments 4' are brought together to encourage them into alignment as the runflat device 2 is tightened onto the wheel. The protrusions 26 and indentations 28 may further have a part spherical shape, to further improve said alignment while tightening, and to increase the integrity and strength of the body of the runflat device 2. It should be noted that other locating features, such as the zigzag sections shown in FIG. 1, could also be used.

Due to the unique, so called 'cantilever', design of the full width segments 4' forming the main body of the runflat device 2, these segments 4' can be made of impact resistant and/or flexible materials, reducing shock and giving greater durability during off-road runflat situations. This is in contrast to known runflat devices which require the use of relatively stiff materials due to design limitations. Also, importantly, the cantilever design and shape of the segments 4' provides increased strength and lighter weight than current systems. Typical runflat devices sit in the wheel well and, thus, have to incorporate an amount of material to provide support from the base of the well. This material inevitably adds weight to the runflat device. The fact that the runflat device 2 of the present invention sits across the width of a wheel without requiring support in the wheel well 10 obviates the requirement for this supporting material, allowing the runflat device 2 to have a hollow interior. The hollow interior not only serves to reduce the overall weight of the runflat device 2 considerably (by approximately 35% in comparison to existing systems for the same wheel size), but also provides several other advantages as outlined below.

The shape of the segments 4' and their central location within the wheel and run the full width of the wheel the outer shape can be formed to the ideal shape required for mine blast deflection. Due to the segments 4' being able to be made in a flexible material the runflat device can be provided with some elastic properties, reducing the shock and blast characteristics of land and anti-personnel mines. Due to the design this blast protection can be used in all types of wheel, including single-piece drop centre wheels, and not merely on multi-piece wheels as is commonly the case.

FIG. 3 shows the same segment 4' from an alternative angle. The interior/underside of the segment 4' is visible, and it should be noted, with reference to both FIG. 2 and FIG. 3, that the protrusions 26 and indentations 28 are provided such that the segment 4' has 180° rotational symmetry in one plane. This is beneficial in that a chain of segments 4' can be constructed without the need to ensure that all segments 4' are commonly oriented.

The main Feature of the segment 4' visible in FIG. 3 is the cable guide 30 which extends from the underside of the segment 4'. As shown in FIG. 3, the cable guide 30 comprises a pair of projections 32, each extending from one of the side portions 20 and each having a channel 34 for guiding a cable. As such, the cable guide 30 provides a pair of channels 34 through which a pair of cables (not shown) can be run. However, it is also possible (as shown in FIG. 1), for the guide 30 to provide a single channel 34 for just a single cable, or for alternative means such as eye bolts to be used. The channels 34 of the illustrated embodiment are provided with a curvature to minimise the possibility of kinks occurring in a cable 14 when the runflat device 2 is assembled and fitted to a wheel, and are located in line with the protrusions 26 and indentations 28.

FIG. 3 also shows that the base edge 22 of each side portion 20 is provided with a bevelled edge 36 which, in use, helps to centralise each segment 4' within the wheel 1 and tyre assembly, and specifically within the beads of the tyre. Finally, although not clearly visible in FIG. 3 or 4, the ends 24 of each side portion 20 are not simply straight edges. Each end 24 of each segment 4' extends parallel to the opposing end 24 of the segment 4', at an approximate right angle to the plane of the top plate 16, until approximately the mid-point of each side portion 20 where the protrusion 26 or indentation 28 is provided. Beyond the mid-point of each side portion 20, the opposing ends 24 of the segment 4' converge slightly towards one another, such that the length of each segment 4' at its top plate 16 is greater than at its base edge 22. This shape allows a plurality of segments 4', once connected together, to form a straight, substantially flat, chain when laid on their top plates 16, and to be curved into a substantially circular loop around a wheel 1, while maintaining reliable abutment between adjacent segments 4' in both configurations. The part-circular protrusions 26 and indentations 28 also help in ensuring that a chain of segments 4', once formed, has sufficient flexibility to allow it to be manipulated from a flat configuration to a substantially circular loop.

Figure 4:
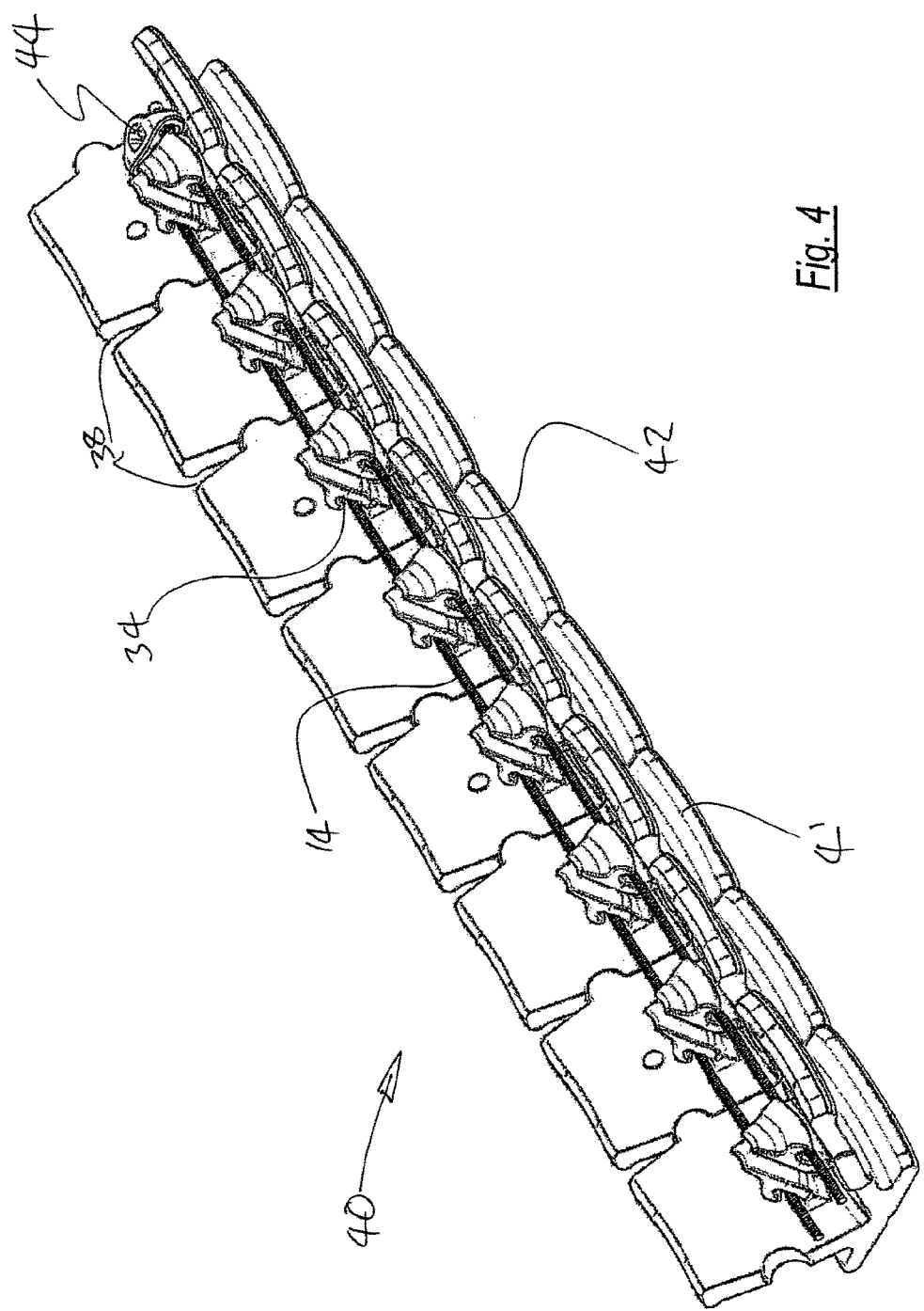
FIG. 4 is a perspective view of a chain of segments as shown in FIG. 3 connected together.

FIG. 4 shows a chain 40 formed from a plurality of segments 4' connected together by a pair of thin cables 14 and arranged in a straight, substantially flat, configuration. The chain 40 is pre-tightened by the cables 14 to ensure that the segments 4' are in abutment with one another, but gaps 38 can be seen between adjacent segments 4' as a result of the convergent parts of the ends 24 of each segment 4'. Also, since the cables 14 are straight in the illustrated configuration, further small gaps 42 are also visible at the ends of each channel 34 due to their in-built curvature.

At the right hand end (as shown) of the chain 40, the cables 14 have been joined to a connector or balancing link 44. The connector 44 not only holds the segments 4' together and prevents the cables 14 from simply running freely through every pair of cable guides 30, but also provides a connection point for the tightening mechanism of the finished runflat device 2. It should be understood that one advantage of the runflat device 2 described herein is that the use of a plurality of identical segments 4' allows for different diameter wheels to be catered for simply through the selection of an appropriate number of segments 4'. As such, it may be that each connector 44 is provided as a separate piece to be joined to the lengths of cable 14 once these have been cut to an appropriate length. Alternatively, pairs of pre-cut cables 14 could come supplied with connectors 44 already fitted. In either case, adding segments 4' to the chain 40 is achieved by simply hooking the cables 14 into the cable guides 30 of each segment 4'.

The design length of each segment 4' means that there are typically sixteen segments for a sixteen inch diameter wheel 1. One segment 4' can be added for each extra inch wheel diameter required. For example, there would be seventeen of the same segments 4' needed to accommodate a seventeen inch wheel 1, or eighteen for an eighteen inch wheel 1. This makes the runflat device 2 of the present invention highly adaptable.

Figure 5:
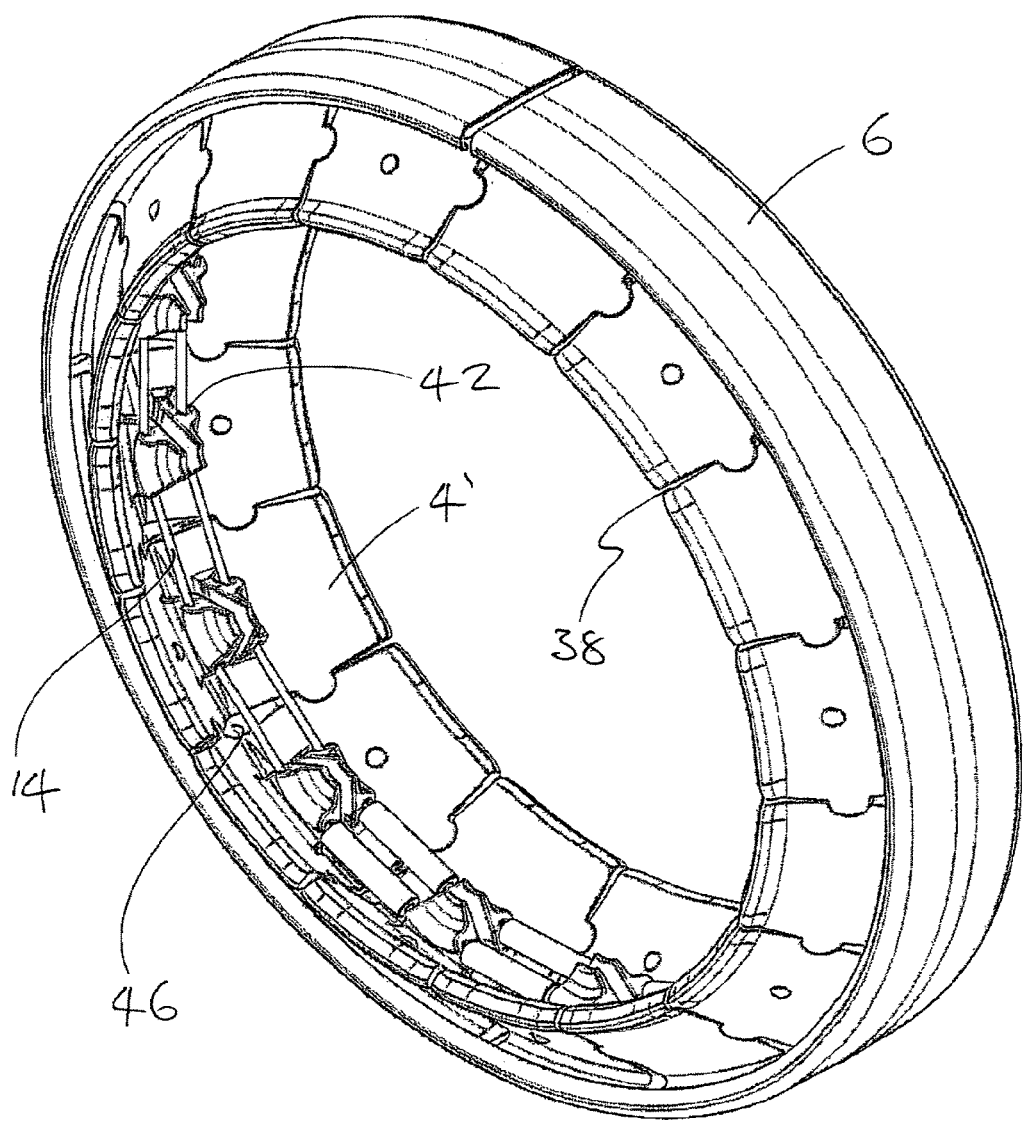
FIG. 5 is a perspective view of a complete runflat device formed into a circular configuration.

FIG. 5 shows the runflat device 2 as it would be when in use. The chain 40 of segments 4' has been formed into a circular configuration and the ends of the chain 40 have been joined together. The location of the cable guide channels 34 in line with the protrusions 26 and indentations 28 of the segments 4' means that the tension in the cables 14 remains unchanged as the chain 40 is formed into a circle. It can be seen that the gaps 38 between the side portions 20 of adjacent segments 4' have closed noticeably in comparison with those shown in FIG. 4. Small gaps 38 still remain, however, meaning that one or more segments 4' may be removed from the runflat device 2, to reduce its diameter, while maintaining reliable abutment between adjacent segments 4'. As the diameter of the runflat device is decreased, the gaps 38 will close further.

Gaps 42 are also still present between the cables 14 and the ends of the cable guides 30 since the radius of curvature of each channel 34 is less than the radius of the runflat device 2 at the location of the channels in the illustrated embodiment. Again, these gaps 42 will close as the overall diameter of the runflat device 2 is decreased.

Given that the individual segments 4' are designed as a universal component, there will be gaps 38 of some size present between adjacent segments 4' in most configurations. The minimum diameter of a runflat device 2 formed from a plurality of segments 4' will be dictated by the degree of convergence provided on the side portions 20 of the segments 4' used in its construction.

The curvature of the runflat device 2 also means that gaps 46 are now present between the top plates 16 of adjacent segments 4'. These gaps 46 are covered by an exterior sleeve/roller 6, which has been applied over the top plates 16 of the segments 4' and wrapped around the edges of the top plates 16 to hold it in place. The roller 6 provides a continuous surface to the exterior of the finished runflat device 2, and is also free to rotate with respect to the remainder of the device when in a runflat situation. This is beneficial in reducing friction between a punctured or flat tyre and the runflat device 2. The 'wrap-around' nature of the roller 6 means that friction is reduced between the runflat device 2 and all parts of a punctured or flat tyre, including the sidewalls, which contact the device 2 during use. Due to the design of the runflat device 2 according to the present invention, the roller 6 is not required to impart any strength to the runflat device 2, so can be manufactured from a material selected for its optimum friction reducing properties. The strength of the runflat device 2 is provided by the segments 4' combining a cantilever and full width design which gives great strength and stability.

The segments 4' forming the main body of the runflat device 2 and the outer roller 6 can be made of dissimilar materials in order to further reduce friction, and therefore heat, greatly increasing runflat performance and distance. Polymers/plastics materials are preferable, and these can incorporate various fillers and additives which further reduce friction. Since it requires little structural strength, the material selected for the roller 6 may also vary depending on the intended purpose of the runflat device 2. For example, a harder material could be used where a runflat device 2 is intended for high speed road use, and a softer or high impact resistant material could be used in runflat devices 2 destined for off-road use. Preferably, the roller 6 is flexible so that it may be fitted over the chain 40 of segments 4' of the runflat device 2 when it is in its flat configuration (shown in FIG. 4), and can bend as required when fitting the runflat device 2 to a wheel. The roller 6, once fitted, is also of benefit in holding the chain 40 of segments 4' together and in avoiding twisting of the runflat device 2 during fitting. As with the segments 4' themselves, the outer roller 6 could be shaped to provide impact resistance for mine blast deflection.

Figure 6:
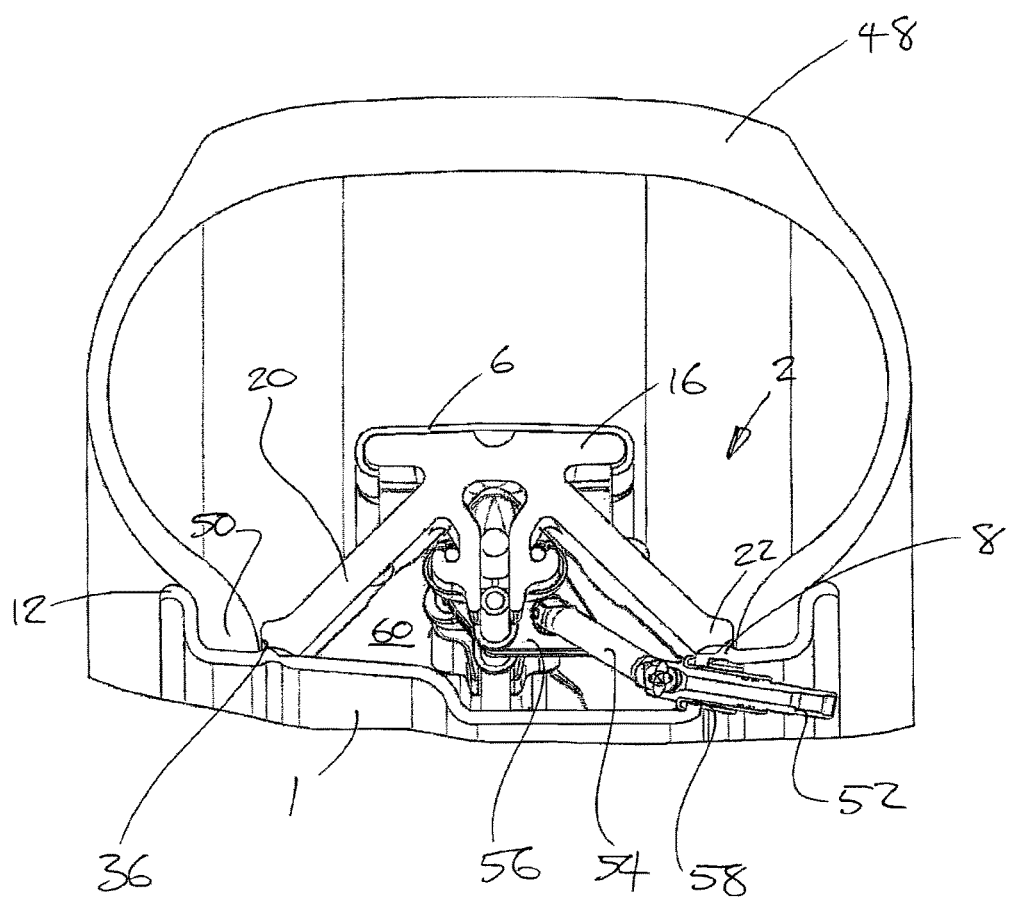
FIG. 6 is a cross-sectional view of a portion of the runflat device of FIG. 5 showing the tightening mechanism.

FIG. 6 shows the runflat device 2 seated on a wheel 1 within a tyre 48. The base edges 22 of the segment 4' shown are seated on the bead retention humps 8 of the wheel 1, adjacent the interior edge of the beads 50 of the tyre 48. The exterior edge of the beads 50 abut against the rim 12 of the wheel 1. The cross-sectional shape of the roller 6 is also shown wrapped around the top plates 16 of the segments 4'. The symmetrical nature of the cross-section means that the centreline (groove 18) of the top plates 16 lies under the centreline of the tyre 48 to provide support at this location in the event of a flat tyre. This is beneficial over many known devices which rely on support from a wheel well 10, since the wheel well 10 is not always centrally located with respect to the wheel 1, which can lead to off centre support and associated undesirable loads and moments on the runflat device.

Given that the diameter of a given wheel 1 is known and the height of the bead retention hump 8 is an industry standard, the point of contact of the runflat device 2, and therefore its required diameter, is easily determined (wheel diameter+bead retention hump height). It is, therefore, possible to make each runflat device 2 a 'universal' fit width-wise and diameter-wise. As there is no necessity for it to sit in the wheel's well, well shape, position or depth is irrelevant.

FIG. 6 also shows the tightening mechanism of the runflat device 2. A valve 52 is connected via a universally jointed linkage 54 to a miniature gear transfer box 56. The valve 52 extends out of a hole 58 in the side of the wheel well 10 in the usual way, and is mounted so as to be rotatable within the hole 58. Rotation of the valve 52 serves to tighten the runflat device 2 onto the wheel 1, as will be described later.

The cantilever shape of each segment 4' with its angled side portions 20, in conjunction with the bevelled edges 36 of the base edges 22 and the inherent flexibility present in each segment 4', allows the runflat device 2 to also function as a true beadlock device. As the runflat device 2 is tightened, the segments 4' initially move down onto the wheel 1 before further tightening causes the angled side portions 20 to move outwardly towards the wheel rims 12. This outward movement applies a significant amount of pressure to the beads 50 of the tyre 58, forcing them into the wheel rims. The more the runflat device 2 is tightened, the greater the lateral pressure applied to the beads 50. Furthermore, any increased force on the top plates 16 of the runflat device 2, such as from the weight and movement of a moving vehicle, simply causes further outward movement of the side portions 20 and thereby increases the beadlock pressure applied to the beads 50 of the tyre 48. The runflat device 2 allows a significant pressure to be applied, creating great lateral pressure against the tyre's beads 50, acting in a manner that would be accepted in the industry as a true beadlock device. This allows the runflat device 2 to be useful in slow speed high torque applications, such as military trucks operating at low tyre pressures (as low as 10 psi) for maximum traction on sand.

It should also be noted that the shape and location of the segments 4' leaves a cavity 60 between the wheel 1 and the runflat device 2, into which the valve 52 runs. This cavity 60 may be filled with a lightweight foam or with other filling materials, possibly via the valve 52, if desirable for a particular application of the runflat device 2. The resultant filling can be of a material and density suitable to absorb deflection of the segments 4' of the runflat device 2 and thereby absorb and deflect the forces created, for example, by the explosion of a mine. The filling can be light in weight, reducing unsprung weight and therefore improving the performance and payload capacity of the vehicle over that of any existing combined runflat/anti-mine devices available for multi-piece wheels and split-rims, which, due to their construction and requirement to provide some degree of lateral beadlock, generally have to be made of heavy rubber materials.

Since the runflat device 2 sits above the point of entry of the air valve 52, pumping foam or similar materials through the air valve 52 only fills the inner hollow cavity of the main body of the runflat device 2, and not of the tyre 58.

Figure 7:
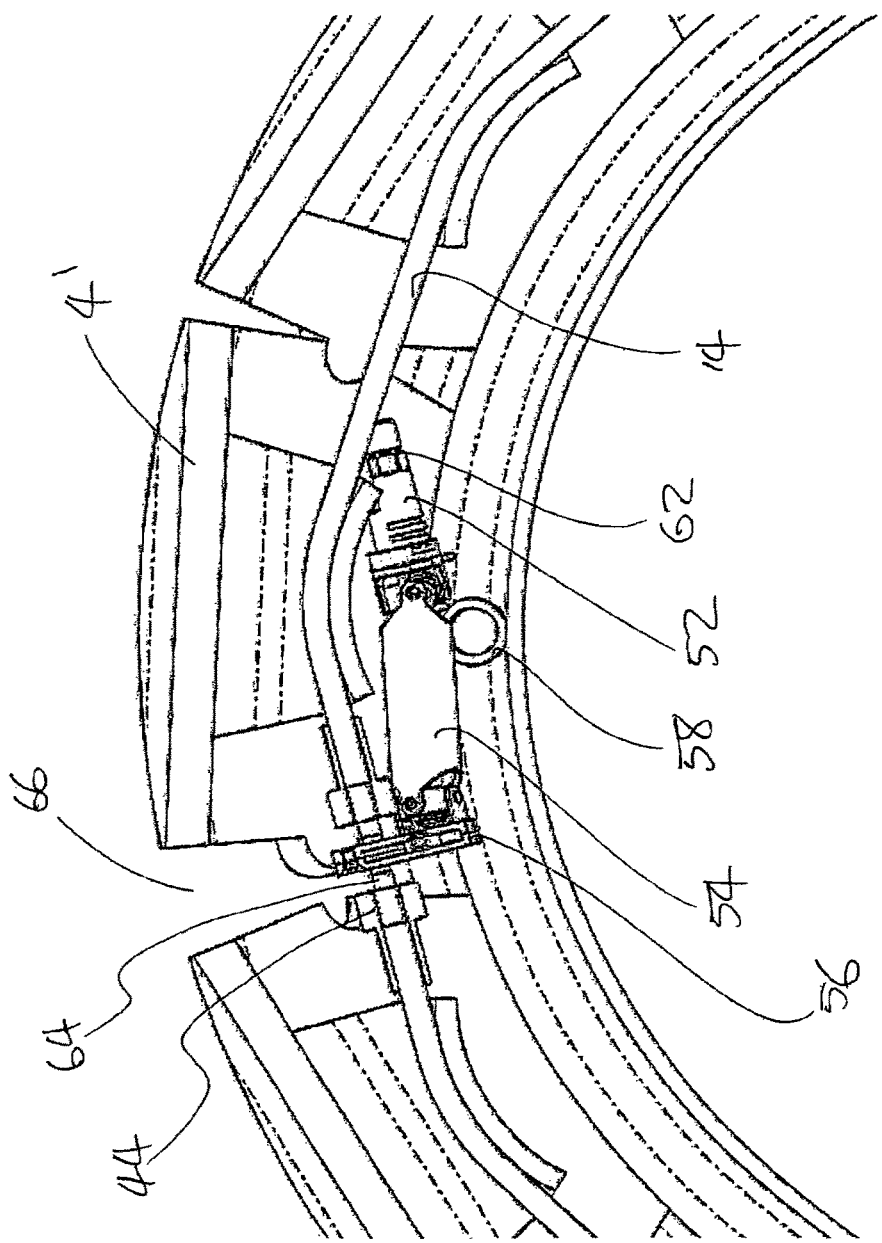
FIG. 7 is an alternative cross-sectional view of a portion of the runflat device showing the tightening mechanism.

FIG. 7 shows an alternative view of the tightening mechanism of the runflat device 2. The valve 52 is shown before being passed through the hole 58 in the side of the wheel well 10, and a hexagonal section 62 is shown on the end of the valve 52 to allow the valve to be rotated using a standard spanner or socket wrench. The universally jointed linkage 54 allows for freedom of movement of the valve 52 during fitting, and to allow for angles present between the axis of the valve 52 and the input to the transfer box 56 when the runflat device 2 is to be tightened. As shown in FIG. 7, the runflat device 2 has not yet been fully tightened as evidenced by the space 66 that exists between the ends of the runflat device 2.

The output of the transfer box 56 comprises a threaded rod 64 having an external thread provided at each of its ends. Each of these external threads is received by an internal thread provided in the connector 44 joined to the ends of the cables 14. The threaded rod 64 is oppositely threaded at its two ends so that rotation of the rod 64 in a first direction will draw a pair of connectors threaded to opposite ends of the rod 64 towards one another. To tighten the runflat device 2 the valve 52 is rotated to rotate the threaded rod 64 which draws the ends of the cables 14, and thereby the ends of the runflat device 2, together. Once the runflat device 2 has been tightened so as to close the space 66, further tightening of the cables 14 serves to apply lateral pressure to the beads of the tyre, as described above in relation to FIG. 6.

The process of fitting of the runflat device 2 described above to a wheel will generally follow the following steps:

- Before connecting the ends of the runflat device together it is inserted into the tyre cavity. In this configuration the runflat device is laid out inside the tyre cavity so that its diameter is greater than the wheel's flanges.
- The tyre's inner (first) bead is fitted over the wheel rim in the normal way, using standard tyre fitter's equipment.
- The tyre, with the runflat device inside, is lifted sufficiently to allow the fitter access to the tyre cavity and the runflat device within it, to be able to connect the two ends of the runflat device and gear transfer box connected to the tyre valve and jointed connection assembly.
- A standard 'fishing tool' (as used by tyre fitters when fitting tubed tyre assemblies) is inserted through the valve hole and connected to the end of the valve.
- The inside of the beads of the tyre, where the outer edges of the runflat device will sit, can be lubricated with normal tyre fitter's lubricant.
- The second bead of the tyre is then fitted to the wheel in the normal way.
- The 'fishing tool' is then used to pull the valve through the valve hole in the wheel and the valve is tightened on the wheel using its standard sleeve/collar. The tyre is then inflated in the normal way and both beads of the tyre are seated in the wheel's seats on each side of the wheel.
- The tyre is then deflated and the sleeve/collar on the valve is loosened. The wheel and tyre assembly is then placed in a normal vertical position, with the valve at the bottom. The valve is manipulated to tighten the runflat device by drawing the ends of the chain of segments together, generally using a normal socket and wrench, and finally tightened to a set torque.
- The external sleeve/collar on the valve is then tightened in the normal way and the tyre is inflated to its required pressure.

Total fitting time for the runflat device 2 is typically less than fifteen minutes, which represents a significant improvement over known systems. The self centring nature of the runflat device 2, due in part to the cantilever design of the segments 4' and the bevelled edges 36 of their side portions, further simplifies the fitting.

It will be appreciated that the present invention is not restricted to the arrangement and features as disclosed in the preferred embodiment. For example, other cross-sectional shapes would also allow the bridging of the wheel well and also provide lateral forces when tightening. Furthermore, alternative materials could be used in construction of the beadlock device.

The invention claimed is:

1. A combination, comprising:
   a wheel having a pair of rims with an area therebetween;
   a tire having a pair of beads; and
   a runflat device having a length which extends around a circumference of the wheel, a top plate, and side portions that extend from the top plate and that displace laterally outwardly toward the rims and compress the beads between the side portions and the rims, in response to the runflat device being tightened around the wheel and in response to a force applied to the top plate of the runflat device.

2. The combination according to claim 1, wherein the runflat device is spaced from the area such that a cavity is provided between the runflat device and the area.

3. The combination according to claim 1, wherein the area comprises a wheel well.

4. The combination of claim 1, wherein the side portions extend toward the wheel from the top plate of the runflat device.

5. The combination of claim 4, wherein the force is applied to the top plate in a direction toward the wheel.

6. The combination of claim 5, wherein the force is applied to the top plate in response to deflation of the tire.

7. The combination of claim 1, wherein the runflat device is tightened around the wheel in response to rotation of a valve assembly.

8. The combination of claim 1, wherein the side portions comprise cantilevered legs extending from the top plate of the runflat device.

9. The combination of claim 8, wherein a distance between the side portions at the top plate is less than a distance between the side portions at the beads.

10. The combination of claim 8, wherein the side portions form a 'V' shape with its apex at a mid point of the top plate.

11. The combination according to claim 1, wherein the displacement of the side portions outwardly toward the rims provides a beadlock.

12. A runflat device for use with a tire mounted on a wheel, the runflat device having a length for extending around a circumference of the wheel and comprising:
    a top plate; and
    side portions extending from the top plate and having ends for engaging beads of the tire, and
    wherein the ends of the side portions displace laterally outwardly in response to the runflat device being tightened around the wheel and in response to a force applied to the top plate of the runflat device.

13. The runflat device of claim 12, wherein outward displacement of the side portions compresses the beads between the side portions and rims of the wheel.

14. The runflat device of claim 12, wherein the ends of the side portions displace outwardly further in response to the force being applied to the top plate in a direction toward the wheel.

15. The runflat device of claim 12, wherein the force is applied to the top plate in response to deflation of the tire.

16. The runflat device of claim 12, wherein the runflat device is tightened around the wheel in response to rotation of a valve assembly.

17. The runflat device of claim 12, wherein the side portions comprise cantilevered legs extending from the top plate of the runflat device.

18. The runflat device of claim 17, wherein a distance between the side portions at the top plate is less than a distance between the side portions at the ends.

19. The runflat device of claim 17, wherein the side portions form a 'V' shape with its apex at a mid point of the top plate.

20. The runflat device of claim 12, wherein outward displacement of the side portions provides a beadlock.

* * * * *